United States Patent [19]
Kallman et al.

[11] Patent Number: 5,774,508
[45] Date of Patent: Jun. 30, 1998

[54] DATA SYNCHRONIZER PHASE DETECTOR AND METHOD OF OPERATION THEREOF

[75] Inventors: Kurt Albert Kallman; Scott David Blanchard, both of Mesa; William Alexander Bucher, Tempe, all of Ariz.

[73] Assignee: Motorola, Inc., Schaumburg, Ill.

[21] Appl. No.: 581,979

[22] Filed: Jan. 2, 1996

[51] Int. Cl.$^6$ ....................................................... H04L 7/02
[52] U.S. Cl. .......................... 375/355; 375/373; 327/159
[58] Field of Search ..................................... 375/316, 344, 375/354, 355, 357, 362, 364, 371, 373, 376; 327/141, 155, 156, 159; 348/536, 537; 360/57; 331/1 R, 1 A, 17, 25, 34, 172; 370/503, 516

[56] References Cited

U.S. PATENT DOCUMENTS

| | | | |
|---|---|---|---|
| 4,768,208 | 8/1988 | Cornett | 375/95 |
| 5,216,554 | 6/1993 | Schneider | 360/51 |
| 5,255,289 | 10/1993 | Tomita | 375/355 |
| 5,426,671 | 6/1995 | Bergmans | 375/354 |
| 5,559,840 | 9/1996 | Melas et al. | 375/355 |

Primary Examiner—Don N. Vo
Assistant Examiner—Amanda T. Le
Attorney, Agent, or Firm—Sherry J. Whitney

[57] ABSTRACT

In a data synchronizer a timing error estimator samples a received stream of digitized data symbols at the beginning, end, and a mid-point of a symbol period. These samples are used with a model that assumes that a data stream waveform should transition along a straight line between its values at optimum sampling instances, separated by the symbol period. Differences between a mid-symbol sample estimated using this straight line model and the actual mid-symbol sample are assumed to be due to a timing error. The timing error estimator performs computations on complex inputs and therefore is compatible with a wide variety of modulation types.

29 Claims, 2 Drawing Sheets

DATA SYNCHRONIZER PHASE DETECTOR AND METHOD OF OPERATION THEREOF

RELATED INVENTIONS

The present invention is related to the following inventions which are assigned to the same assignee as the present invention:

(1) U.S. Pat. No. 4,768,208, "Mid-Symbol Sampling Timing Estimator"; and (2) Ser. No. 08/582,840, "Data Synchronizer Lock Detector and Method of Operation Thereof", filed on even date herewith, now U.S. Pat. No. 5,694,440.

TECHNICAL FIELD

The invention relates to signal processing and, in particular, to a data synchronizer phase detector and method of operation thereof.

BACKGROUND OF THE INVENTION

In the field of data communications a wide variety of modulation schemes are known for communicating data. These schemes operate at varying degrees of speed, accuracy, and efficiency. The present invention has utility in communications receivers, such as radio receivers, modems, etc., which should be capable of accurately and efficiently analyzing received, modulated signals to identify data symbols that have been encoded therein. A "data symbol" represents a unit of information containing one or more bits of data which are encoded for transmission and reception.

A communications receiver can contain a data synchronizer for optimizing the sampling of a received data stream and ultimately producing an accurate reproduction of the transmitted data. A typical data synchronizer comprises a timing error estimator whose timing error signal output is used to adjust the sampling of the received data stream.

Various timing error estimators are known. For example, a "maximum likelihood" timing error estimator represents an optimum approach to the generation of a timing error signal. In theory, the maximum likelihood method can provide acceptable results, but this method is too computationally intensive for practical use in most applications.

A "squaring" timing estimator represents another technique. This technique is based upon filtering and squaring a data stream input signal to generate a sinusoidal component with a frequency equal to the symbol rate. Timing error estimation is then accomplished by heterodyning this sinusoidal component with a local oscillator and low pass filtering.

An "early/late gate" timing simulator represents yet another approach. This scheme produces a timing error estimate by integrating over two half periods of each symbol pulse, and subtracting the results. The sign of the difference is then corrected according to the polarity of the pulse.

Both the squaring and early/late gate timing estimators are less computationally intensive than the maximum likelihood timing estimator. However, each of the squaring and early/late gate timing estimators achieve undesirably poor performance results in terms of linearity and estimation noise.

While the timing estimator described in the above-cited U.S. Pat. No. 4,768,208 overcomes many of the disadvantages of the prior art circuits, it would find broader applications if its implementation could be simplified.

Therefore, there is a substantial need to provide a timing estimator which is efficient, accurate, and relatively low in complexity and cost of implementation.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

The present invention provides an improved method and apparatus for mid-sample symbol synchronization. In a preferred form, a sampler samples at least one symbol in a sequence of data symbols at its beginning, mid-point, and end, to produce a begin-symbol sample, an actual mid-symbol sample, and an end-symbol sample, respectively. These samples are stored. The device calculates an estimated mid-symbol sample as a function of the begin-symbol sample and end-symbol sample at the point in time for which the actual mid-symbol sample was measured. Then the device computes a timing error value as a function of these begin-symbol, estimated mid-symbol, actual mid-symbol, and end-symbol samples. The calculation is performed using only sign detection, addition, and relatively simple multiplication operations, and it does not require a computationally intensive multiplication or division operation.

Figure 1:
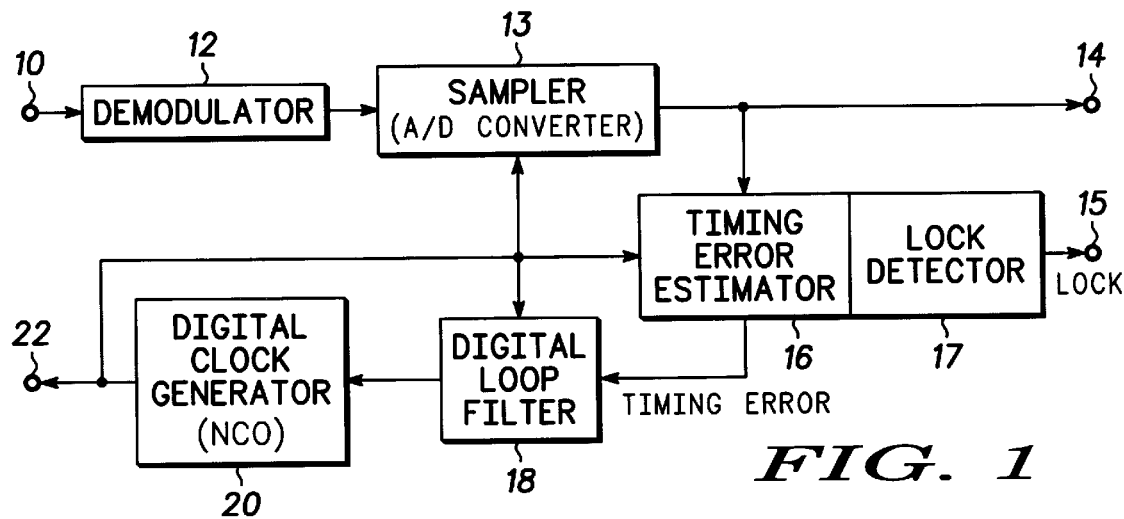
FIG. 1 shows a block diagram of a sampled system which uses a timing error estimator.

FIG. 1 shows a block diagram of a sampled system which uses a timing error estimator. In FIG. 1 an input signal is applied at a terminal 10 as an input of a demodulator 12. Demodulator 12 removes a carrier or otherwise converts the input signal to an analog signal, or signals, whose amplitude values define the transmitted data symbols. Thus, a sequence of data symbols is provided by the output of demodulator 12 in the form of analog signals. It will be understood by one of ordinary skill in the art that the present invention can be implemented either in analog or digital form. In a preferred embodiment the present invention is implemented in a digital (sampled) form.

The output of demodulator 12 couples to the input of a sampler 13, which in a preferred embodiment is an analog-to-digital (A/D) converter, that digitizes the signal to N bits at a rate that is twice the symbol period. The output of the sampler 13 is coupled to a terminal 14 and to an input of a timing error estimator 16. A timing error signal is presented in an output signal from timing error estimator 16. The output of timing error estimator 16 couples to an input of a digital loop filter 18, and an output of digital loop filter 18 couples to a control input of a digital clock generator 20, such as a numerically controlled oscillator (NCO).

Clock generator 20 provides the sample timing for a modem, which is merely exemplary of one type of communications receiver which can utilize the present invention. In other words, clock generator 20 provides a signal which controls when the output from demodulator 12 is sampled, i.e. at the desired portion of the demodulated sequence of data symbols. The samples are taken off the input data stream, or the output of demodulator 12, for determination of which one of a predetermined set of possible symbols is encoded into the data stream at the sampled points in time.

Samples taken at optimum points in time most accurately reflect symbols encoded in the data stream.

An output from clock generator 20 couples to an output terminal 22, to a timing input of timing error estimator 16, to sampler 13, and to digital loop filter 18. A control loop is formed between timing error estimator 16, loop filter 18, and clock generator 20. Thus, the timing error output value from timing error estimator 16 controls the phase and frequency of clock generator 20 so that sampling of the output signal from demodulator 12 occurs at an optimum time. For example, with increasing (or decreasing) timing error output values, clock generator 20 causes sampling of the data stream to occur earlier, which in turn causes timing error output values to decrease (or increase).

Timing error estimator 16 continues to operate throughout a transmission of data, and the phase of a signal generated by clock generator 20 which samples this data is constantly being adjusted under influence of this control loop so that an optimum sample timing is maintained.

A lock detector circuit 17, described in greater detail in Related Invention No. 2, generates a LOCK signal at output terminal 15.

Figure 2:
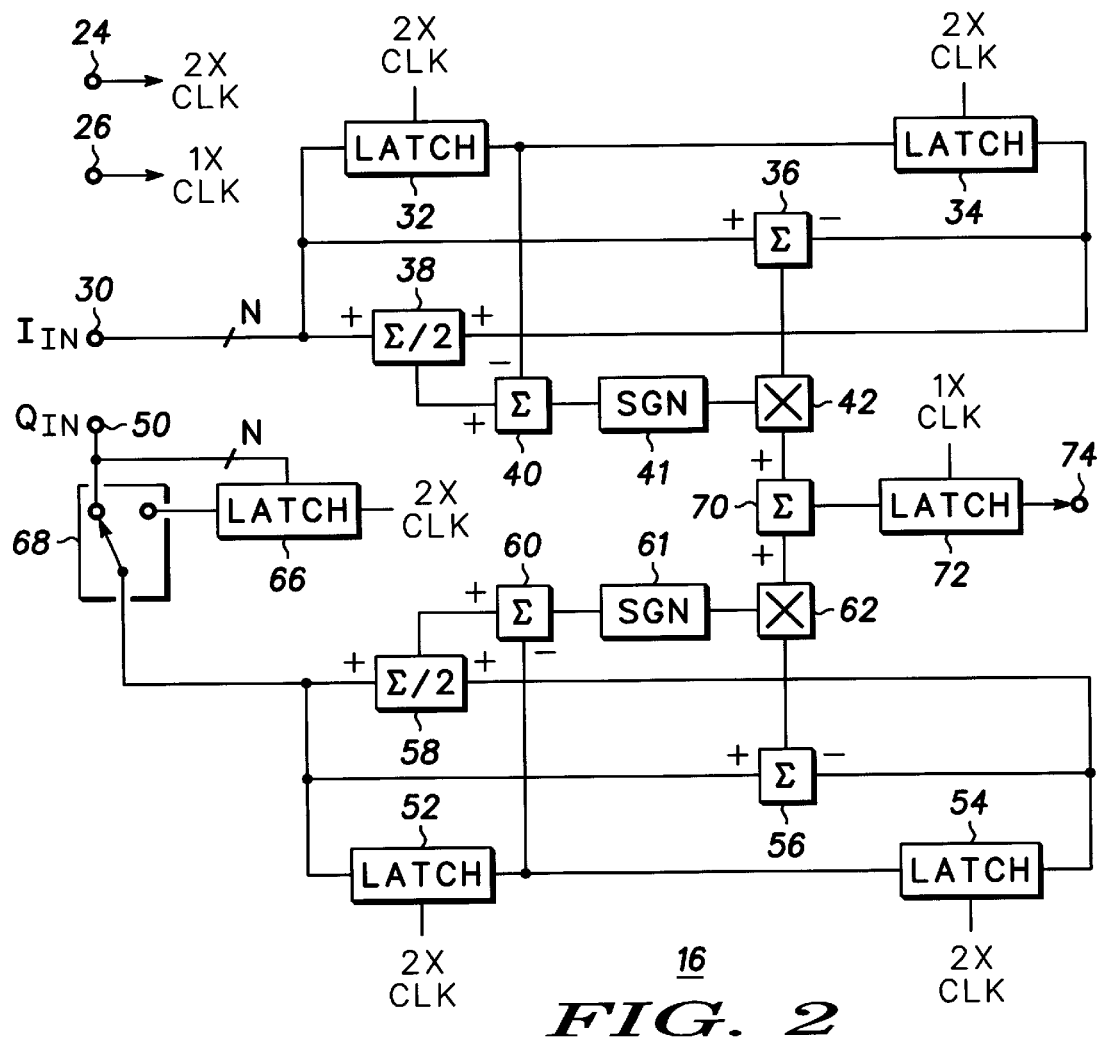
FIG. 2 shows a block diagram of a timing error estimator, in accordance with a preferred embodiment of the present invention.

FIG. 2 shows a block diagram of a timing error estimator, in accordance with a preferred embodiment of the present invention. The output from demodulator 12 (see FIG. 1) represents two signals. One signal presents an in-phase (I) component, and the other signal presents a quadrature (Q) component of the received signal. Thus the symbol contains data which has been encoded into the relative amplitude of these two signals.

Still referring to FIG. 2, the N-bit I component $I_{IN}$ of the received signal is applied at a terminal 30, and the N-bit Q component $Q_{IN}$ of the received signal is applied at a terminal 50. Terminal 30 connects to a signal input of a latch 32, a plus input of an adder 36, and a first plus input of an adder 38. An output of latch 32 couples to a minus input of an adder 40 and a signal input of a latch 34.

An output of latch 34 couples to a second plus input of adder 38 and to minus input of adder 36. Adder 38 has an output which represents one-half of the sum of signals presented at its first and second inputs. This output of adder 38 connects to a plus input of adder 40. An output of adder 40 couples to a first input of a sign detection circuit 41, whose output couples to a first input of multiplier 42.

Sign detection can be implemented in any well known manner, such as examining the most significant bit of the digital output of adder 40. The output of adder 36 couples to a second input of multiplier 42. The output of multiplier 42 couples to a first plus input of an adder 70.

Quadrature input terminal 50 couples to a first node of a switch 68 and an input of a latch 66. An output of latch 66 couples to a second node of switch 68. A third node of switch 68 couples to a first plus input of an adder 58, a plus input of an adder 56, and an input of a latch 52. An output of latch 52 couples to a minus input of an adder 60 and to an input of latch 54.

An output of latch 54 couples to a minus input of adder 56 and to a second plus input of adder 58. Adder 58 has an output which represents one-half of the sum of the signals presented at its first and second plus inputs. This output of adder 58 connects to a plus input of adder 60. An output of adder 60 connects to a first input of a sign detection circuit 61. The output of sign detect circuit couples to a first input of a multiplier 62. Multipliers 42 and 62 can be implemented in any well known manner. In a preferred embodiment, multipliers 42 and 62 perform only a simple 1-bit by N-bit operation, where N is a positive integer representing the number of bits of a signal to be multiplied.

An output of adder 56 connects to a second input of multiplier 62. An output of multiplier 62 connects to a second plus input of adder 70. An output of adder 70 connects to an input of latch 72, whose output is coupled to terminal 74.

A master clock signal is applied at a terminal 26, which in turn is coupled to a clock input of latch 72. The master clock signal provides the sample timing for a modem which uses timing error estimator 16, and it is provided by clock generator 20 (see FIG. 1). This master clock signal represents the signal whose phase is controlled by the output from timing error estimator 16. This output from timing error estimator 16 is provided at terminal 74. A two-times (2X) clock is provided at a terminal 24 which connects to clock inputs of latches 32, 34, 66, 52, and 54. The 2X clock operates at twice the rate of the master clock, which is provided at terminal 26, and it is synchronized with the clock provided at terminal 26 so that the 2X clock transitions at substantially the same time that the master clock transitions.

The sequence of data symbols comprises a real component and an imaginary component. Latch 34 supplies the real, or in-phase begin-symbol sample and track, and latch 54 provides the imaginary, or quadrature, begin-symbol sample. Likewise, latches 32 and 52 provide actual mid-symbol samples for the real and imaginary components, respectively. Additionally, at the time which the master clock signal provided at terminal 26 strobes latch 72, input terminals 30 and 50 provide end-symbol samples for real and imaginary components, respectively. Adders 36 and 56 provide differences between end-symbol and begin-symbol samples for the real and imaginary components. These represent the sign and magnitude of the data transition. Then, adders 38 and 58 calculate the estimated mid-symbol samples for the real and imaginary components. Adders 40 and 60 obtain differences between estimated and actual mid-symbol samples for real and imaginary components, respectively. Sign detection circuits 41 and 61 determine the sign of the differences between estimated and actual samples (error) for real and imaginary components.

Multipliers 42 and 62 calculate a correlation between the sign of the differences and the sign and magnitude of the data transitions. The result is a timing error estimate. These estimates or correlations for the in-phase and quadrature-phase channels are summed by adder 70 to produce a timing error signal, which is latched by latch 72 and output at terminal 74. This timing error signal, is used to control the sampling of the sequence of data symbols by sampler 13.

Switch 68 operates in conjunction with latch 66 in a preferred embodiment to allow timing error estimator 16 to operate with staggered modulation formats, such as offset quadrature phase shift keying (OQPSK) and minimum shift keying (MSK). Switch 68 routes the signal presented directly at quadrature input terminal 50 to its third node when non-offset types of modulation are encountered. However, switch 68 selects the output signal from latch 66 when offset types of modulations occur. Latch 66 operates to delay the quadrature portion of the signal so that subsequent sampling of latches 32, 34, 52, and 54 will be measured at substantially equivalent times.

In operation, latches 34 and 54 provide the real and imaginary in-phase begin-symbol samples, respectively. Latches 32 and 52 provide the real and imaginary actual mid-symbol samples, respectively. And terminals 30 and 50 provide the real and imaginary end-symbol samples, respectively, when the master clock signal strobes latch 72.

Adders 36 and 56 generate the differences between the begin-symbol sample and the end-symbol sample, for the real and imaginary components, respectively. This is fundamentally a measure of the data transition sign and magnitude. If no transition occurs, the beginning and ending samples will be equivalent, and the output of adders 36 and/or 56 will be zero.

Adders 38 and 58 estimate the expected value of the mid-sample value, for the real and imaginary components, respectively, by calculating one-half of the sum of the beginning and ending samples. If the data transitioned from +A to −A, the output would be zero, and if no transition occurred, the output is equal to the values at the beginning and ending samples.

Adders 40 and 60 calculate the difference, or error, between the estimated mid-symbol and the actual mid-symbol sample, for the real and imaginary components, respectively.

Sign detectors 41 and 61 simply output the sign, or polarity, of the error signal which is then used by multipliers 42 and 62, respectively, to invert or not invert the outputs of adders 36 and 56 (the sign and magnitude of the data transition). This is a correlation between the sign of the error and the data transition.

Latch 72 is used to de-multiplex the correct timing error samples to the output. Latch 66 is employed to de-stagger the channel and realign it for processing of staggered modulation formats.

One of ordinary skill in the art will understand that the latching function performed by latch 72 can be implemented in other suitable ways including providing an appropriate latch prior to nodes 30 and 50.

If the received signal has only a real component such as in binary phase-shift keying (BPSK), or if it is desired to reduce the amount of circuitry at the expense of reduced timing estimator performance, the circuits associated with the Q channel can be eliminated (68, 66, 58, 52, 56, 54, 60, 61 and 62), summing circuit 70 can be eliminated, and the output of multiplier 42 can be directly coupled to latch 72.

One of ordinary skill in the art will also recognize that the timing error estimator shown in FIG. 2 will operate, although with reduced performance, if the sign detector circuits 41 and 61 were eliminated. In such case, the complexity of multiplier circuits 42 and 62 would increase.

Figure 3:
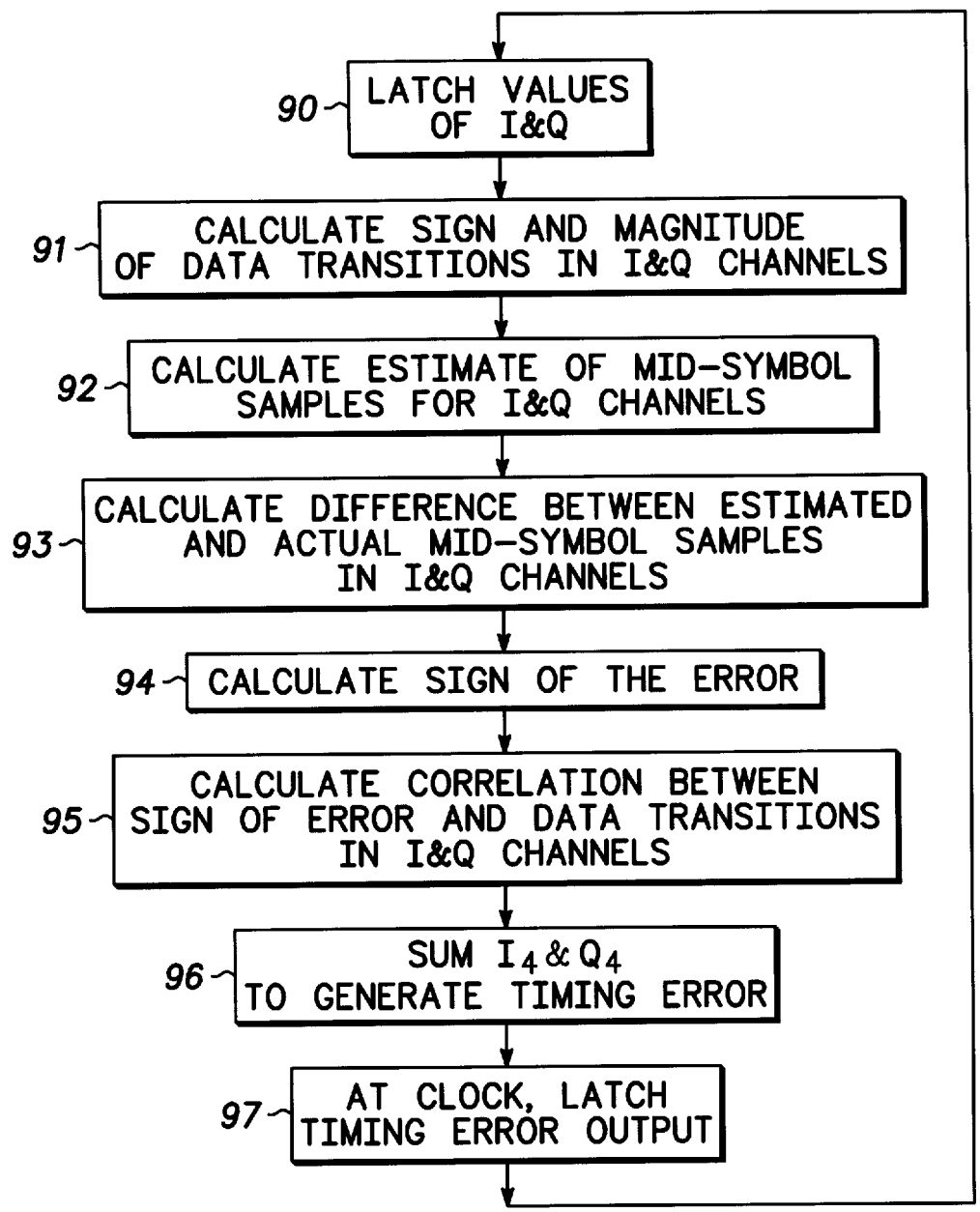
FIG. 3 shows a flow diagram of a method for generating a timing error, in accordance with a preferred embodiment of the present invention.

FIG. 3 shows a flow diagram of a method for generating a timing error, in accordance with a preferred embodiment of the present invention.

First, the process begins in box 90, wherein the values of the real signal components I(t) and I(t−Ts/2) and I(t−Ts) are latched, and the values of the imaginary signal components Q(t) and Q(t−Ts/2) and Q(t−Ts) are latched.

Then in box 91 the sign and magnitude of the data transition in the I and Q channels are calculated according to the following equations:

$$I_1 = I(t) - I(t-Ts) \qquad \text{Equation 1}$$

$$Q_1 = Q(t) - Q(t-Ts) \qquad \text{Equation 2}$$

Next, in box 92 the estimates of the value of the mid-symbol samples in the I and Q channels are calculated according to the following equations:

$$I_2 = 1/2[I(t) + I(t-Ts)] \qquad \text{Equation 3}$$

$$Q_2 = 1/2[Q(t) + Q(t-Ts)] \qquad \text{Equation 4}$$

Next, in box 93 the difference (error) between the estimated and actual mid-symbol samples in the I and Q channels are calculated according to the following equations:

$$I_3 = I_2 - I(t-Ts/2) \qquad \text{Equation 5}$$

$$Q_3 = Q_2 - Q(t-Ts/2) \qquad \text{Equation 6}$$

Next, in box 94 the SIGN of the errors, I3 and Q3, in the I and Q channels, respectively, is calculated.

Next, in box 95 the correlation between the sign of the error and the data transitions in the I and Q channels is calculated as follows:

$$I_4 = Sgn(I_3) \times I_1 \qquad \text{Equation 7}$$

$$Q_4 = Sgn(Q_3) \times Q_1 \qquad \text{Equation 8}$$

$I_4$ represents a "real" correlation, and $Q_4$ represents an "imaginary" correlation.

Next, in box 96, $I_4$ and $Q_4$ are summed to generate the timing error.

In box 97 the timing error output is latched at CLK, and the process returns to box 90. It will be understood that the process repeats in a constant loop.

It will be apparent to those skilled in the art that if the received signal has only a real component such as in BPSK, or if the number of computations is desired to be reduced at the expense of higher timing jitter, all equations on the Q channel can be eliminated (i.e. Equations 2, 4, 6, and 8).

In summary, the method and apparatus of the present invention represents a timing error estimator which is computationally efficient. The present invention avoids problems associated with known prior art circuits. It is an important advantage of the present invention that it does not require computationally intensive operations such as division, so it can be implemented with fewer gates and hence consumes less power and semiconductor chip area and is lower in cost. In addition, it minimizes cycle slipping. The present invention operates with offset and non-offset modulation types in addition to modulation schemes ranging from simple binary phase-shift keying (BPSK) to 256-QAM (quadrature amplitude modulation).

It will be apparent to those skilled in the art that the disclosed invention can be modified in numerous ways and can assume many embodiments other than the preferred form specifically set out and described above. For example, the present invention can be implemented either in digital circuitry or by a programmed digital computer. In addition, the point at which the actual latching or sampling of the signals occurs can be changed appropriately.

Accordingly, it is intended by the appended claims to cover all modifications of the invention which fall within the true spirit and scope of the invention.

What is claimed is:

1. In a data synchronizer phase detector, a method of generating a timing error signal comprising the steps of:

sampling, by a sampler responsive to a demodulated sequence of data symbols, said data symbols at a desired portion of said data symbols; and generating, by a timing error estimator, said timing error signal representing the difference between an estimated mid-symbol sample and an actual mid-symbol sample, said timing error signal being supplied to said sampler, wherein generating said timing error signal is performed using only one or more sign detection operations, one or more addition operations, and one or more multiplication operations.

2. The method recited in claim 1, wherein a multiplication operation of said one or more multiplication operations is a 1-bit by N-bit operation, where N is a positive integer representing the number of bits of a signal to be multiplied.

3. The method recited in claim 1, wherein said method further comprises the step of:

calculating a correlation between the sign of an error between an estimated and an actual mid-symbol sample and a data transition in said demodulated sequence of data symbols.

4. The method recited in claim 3, wherein said demodulated sequence of data symbols comprises a real component and an imaginary component, and wherein said method further comprises the step of:

calculating said correlation for both said real component and said imaginary component.

5. The method recited in claim 4, wherein said method further comprises the steps of:

summing said correlation for both said real component and said imaginary component to produce said timing error signal; and using said timing error signal to control the sampling of said demodulated sequence of data symbols by said sampler.

6. The method recited in claim 1, wherein said desired portion of said data symbols for sampling is mid-symbol.

7. The method recited in claim 1, wherein said data synchronizer phase detector is a component of a radio receiver.

8. The method recited in claim 1, wherein said data synchronizer phase detector is a component of a modem.

9. In a data synchronizer phase detector, a method of generating a timing error signal comprising the steps of:

sampling, by a sampler responsive to a demodulated sequence of data symbols, at least one of said data symbols at desired portions of said at least one data symbol, said sampler sampling said at least one data symbol at its beginning, mid-point, and end, to produce a begin-symbol sample, an actual mid-symbol sample, and an end-symbol sample, respectively, and storing said begin-symbol sample, said actual mid-symbol sample, and said end-symbol sample;

using, by a timing error estimator, said begin-symbol and end-symbol samples, calculating a sign of a data transition and a magnitude of said data transition in said demodulated sequence of data symbols;

using said begin-symbol and end-symbol samples, calculating an estimated mid-symbol sample;

calculating a difference between said actual mid-symbol sample and said estimated mid-symbol sample;

determining a sign of said difference; and correlating said sign of said difference with said sign of said data transition in said demodulated sequence of data symbols to produce said timing error signal, said timing error signal being supplied to said sampler.

10. The method recited in claim 9, wherein said sampler samples both real and imaginary components of said data symbols, and wherein said method further comprises:

correlating said sign of said difference with said sign of said data transition in said demodulated sequence of data symbols for both said real and said imaginary components to produce a real correlation and an imaginary correlation.

11. The method recited in claim 10, wherein said method further comprises the step of summing both said real and imaginary correlations to produce said timing error signal.

12. The method recited in claim 9, wherein one of said desired portions of said data symbols for sampling is mid-symbol.

13. The method recited in claim 9, wherein said data synchronizer phase detector is a component of a radio receiver.

14. The method recited in claim 9, wherein said data synchronizer phase detector is a component of a modem.

15. A data synchronizer phase detector comprising:

a sampler responsive to a demodulated sequence of data symbols for sampling at least one of said data symbols at desired portions of said at least one data symbol, said sampler sampling said at least one data symbol at its beginning, mid-point, and end, to produce a begin-symbol sample, an actual mid-symbol sample, and an end-symbol sample, respectively, and storing said begin-symbol sample, said actual mid-symbol sample, and said end-symbol sample; and a timing error estimator for generating a timing error signal, said timing error signal being supplied to said sampler to control when said sampler samples said demodulated sequence of data symbols, said timing error estimator comprising:

a first circuit portion, responsive to said begin-symbol and end-symbol samples, for calculating a sign of a data transition and a magnitude of said data transition in said demodulated sequence of data symbols;

a second circuit portion, responsive to said begin-symbol and end-symbol samples, for calculating an estimated mid-symbol sample; and a third circuit portion, responsive to said actual mid-symbol sample and said estimated mid-symbol sample, for calculating a difference between said actual mid-symbol sample and said estimated mid-symbol sample, said difference representing said timing error signal, wherein said third circuit portion calculates said difference without using a division operation.

16. The data synchronizer phase detector recited in claim 15, wherein one of said desired portions of said data symbols for sampling is mid-symbol.

17. The data synchronizer phase detector recited in claim 15, wherein said sampler is an analog-to-digital converter.

18. The data synchronizer phase detector recited in claim 15, wherein said data synchronizer phase detector is a component of a radio receiver.

19. The data synchronizer phase detector recited in claim 15, wherein said data synchronizer phase detector is a component of a modem.

20. A data synchronizer phase detector comprising:

a sampler responsive to a demodulated sequence of data symbols for sampling at least one of said data symbols at desired portions of said at least one data symbol, said sampler sampling said at least one data symbol at its beginning, mid-point, and end, to produce a begin-symbol sample, an actual mid-symbol sample, and an end-symbol sample, respectively, and storing said begin-symbol sample, said actual mid-symbol sample, and said end-symbol sample: and a timing error estimator for generating a timing error signal, said timing error signal being supplied to said sampler to control when said sampler samples said demodulated sequence of data symbols, said timing error estimator comprising:

a first circuit portion, responsive to said begin-symbol and end-symbol samples, for calculating a sign of a data transition and magnitude of said data transition in said demodulated sequence of data symbols;

a second circuit portion, responsive to said begin-symbol and end-symbol samples, for calculating an estimated mid-symbol sample: and a third circuit portion, responsive to said actual mid-symbol sample and said estimated mid-symbol sample, for calculating a difference between said actual mid-symbol sample and said estimated mid-symbol sample, said difference representing said timing error signal;

a fourth circuit portion for determining a sign of said difference; and a fifth circuit portion for correlating said sign of said difference with said sign of said data transition in said demodulated sequence of data symbols to produce said timing error signal.

21. The data synchronizer phase detector recited in claim 20, wherein said sampler samples both real and imaginary components of said data symbols, and wherein said fifth circuit portion said sign of said difference with said sign of said data transition in said demodulated sequence of data symbols for both said real and said imaginary components to produce a real correlation and an imaginary correlation.

22. The data synchronizer phase detector recited in claim 20 and further comprising:

a sixth circuit portion for summing both said real and imaginary correlations to produce said timing error signal.

23. A data synchronizer phase detector comprising:

a sampler responsive to a demodulated sequence of data symbols for sampling at least one of said data symbols at desired portions of said at least one data symbol, said sampler sampling said at least one data symbol at its beginning, mid-point, and end, to produce a begin-symbol sample, an actual mid-symbol sample, and an end-symbol sample, respectively, and storing said begin-symbol sample, said actual mid-symbol sample, and said end-symbol sample; and a timing error estimator for generating a timing error signal, said timing error signal being supplied to said sampler to control when said sampler samples said demodulated sequence of data symbols, said timing error estimator comprising;

a first circuit portion, responsive to said begin-symbol and end-symbol samples, for calculating a sign of a data transition and magnitude of a data transition in said demodulated sequence of data symbols;

a second circuit portion, responsive to said begin-symbol and end-symbol samples, for calculating an estimated mid-symbol sample;

a third circuit portion, responsive to said actual mid-symbol sample and said estimated mid-symbol sample, for calculating a difference between said actual mid-symbol sample and said estimated mid-symbol sample;

a fourth circuit portion for determining a sign of said difference; and a fifth circuit portion for correlating said sign of said difference with said sign of said data transition in said demodulated sequence of data symbols to produce said timing error signal.

24. The data synchronizer phase detector recited in claim 23, wherein said sampler samples both real and imaginary components of said data symbols, and wherein said fifth circuit portion correlates said sign with a data transition in said demodulated sequence of data symbols for both said real and said imaginary components to produce a real correlation and an imaginary correlation.

25. The data synchronizer phase detector recited in claim 24 and further comprising:

a sixth circuit portion for summing both said real and imaginary correlations to produce said timing error signal.

26. The data synchronizer phase detector recited in claim 23, wherein one of said desired portions of said data symbols for sampling is mid-symbol.

27. The data synchronizer phase detector recited in claim 23, wherein said sampler is an analog-to-digital converter.

28. The data synchronizer phase detector recited in claim 23, wherein said data synchronizer phase detector is a component of a radio receiver.

29. The data synchronizer phase detector recited in claim 23, wherein said data synchronizer phase detector is a component of a modem.

* * * * *